United States Patent [19]

Kishimoto et al.

[11] Patent Number: 4,730,225

[45] Date of Patent: Mar. 8, 1988

[54] TAPE LOADING APPARATUS HAVING A TAPE PREVENTIVE MEMBER FOR PREVENTING MAGNETIC TAPE FROM BEING INSERTED BETWEEN A TAPE DRAWING MEMBER AND A TAPE GUIDE MEMBER THEREOF

[75] Inventors: Yoshinobu Kishimoto, Takarazuka; Toshikazu Ura, Neyagawa; Hidetaka Sasaki, Okayama, all of Japan

[73] Assignee: Matsushita Electric Industrial Co., Ltd., Osaka, Japan

[21] Appl. No.: 821,548

[22] Filed: Jan. 22, 1986

[30] Foreign Application Priority Data

Jan. 24, 1985 [JP] Japan .................................. 59-11241

[51] Int. Cl.$^4$ ........................................... G11B 15/665
[52] U.S. Cl. ........................................ 360/85; 360/95; 360/130.23
[58] Field of Search ................ 360/84, 85, 95, 130.22, 360/130.23; 242/197, 199

[56] References Cited

U.S. PATENT DOCUMENTS

| | | | |
|---|---|---|---|
| 4,191,979 | 3/1980 | Poehler | 360/85 |
| 4,366,516 | 12/1982 | Ogata et al. | 360/84 |
| 4,520,411 | 5/1985 | Ohshima | 360/85 |

Primary Examiner—Stuart N. Hecker
Assistant Examiner—Benjamin E. Urcia
Attorney, Agent, or Firm—Wenderoth, Lind & Ponack

[57] ABSTRACT

A tape loading apparatus in a video tape recorder has first and second tape drawing mechanisms movably supported between an unloading position, in which they are accommodated within respective recesses in a tape cassette containing magnetic tape, and a loading position in which a portion of the magnetic tape is urged around a tape guide cylinder. At least one of the tape drawing mechanisms includes a tape drawing member and a tape guide member. A tape protective member for preventing any possible entry of a portion of the magnetic tape in between the tape drawing member and the tape guide member is mounted on top of the tape guide member so as to partially overhang the tape drawing member.

8 Claims, 3 Drawing Figures

TAPE LOADING APPARATUS HAVING A TAPE PREVENTIVE MEMBER FOR PREVENTING MAGNETIC TAPE FROM BEING INSERTED BETWEEN A TAPE DRAWING MEMBER AND A TAPE GUIDE MEMBER THEREOF

BACKGROUND OF THE INVENTION

The present invention generally relates to a video tape recorder of a type utilizing a cassette tape and, more particularly, to a tape loading apparatus in the video tape recorder for drawing a portion of magnetic video tape out of the tape cassette for urging the tape around a tape guide cylinder.

Currently commercially available video tape recorders of the helical scan type, with the exception of those for professional use, are designed so that when a tape cassette having a length of magnetic video tape reeled therein is inserted in a cassette holder of the video tape recorder and is then brought to a set position from above, a portion of the video tape can be drawn out from a "mouth" of the tape cassette and can be subsequently urging the tape around a tape guide cylinder generally in a configuration similar to the shape of a figure "Ω". Information recording or reproduction with respect to the video tape is performed by one or more rotary heads after that portion of the video tape has been urged around the tape guide cylinder. In these video tape recorders, a tape loading apparatus is utilized which comprises a pair of spaced tape drawing means each including a tape drawing member and a tape guide member. In recorders in which the tape guide cylinder is mounted on a chassis with its longitudinal axis inclined at a relatively great angle with respect to the chassis and the pair of tape drawing means are supported for movement above the chassis in the same plane (two-dimensional plane), the tape drawing member and the tape guide member of each tape drawing means can be arranged in a side-by-side relationship with each other in a direction perpendicular to the direction in which that portion of the video tape is drawn, that is, in a direction lengthwise of that portion of the video tape exposed to the outside from the mouth of the tape cassette, then held in the set position, and therefore, there is a possibility that, as the tape cassette is brought to the set position, that portion of the video tape may be trapped between the tape drawing member and the tape guide member of one or both of the tape drawing means. Once that portion of the video tape is trapped in between the tape drawing member and the tape guide member, and when the tape drawing means are subsequently moved for urging the tape around the tape guide cylinder, that portion of the video tape and, hence, the whole length of video tape in the tape cassette will be detrimentally impaired.

However, with the advent of a small-sized and light weight video tape recorder of the helical scan type, not only is an arrangement provided in which the tape guide cylinder has a relatively reduced outer diameter and the tape guide cylinder is mounted on the chassis with its longitudinal axis inclined at a relatively small angle to the chassis, but also, in order for that portion of the video tape to be wrapped 270° around the tape guide cylinder, one of the tape drawing means which, when having been moved to a loaded position at which that portion of the video tape has been turned around the tape guide cylinder in preparation for information recording or reproduction, occupies a leading position with respect to the direction of the forward run of the video tape is supported at a level higher than the other of the tape drawing means which at that time occupies a trailing position with respect to the direction of the forward run of the same video tape. This type of video tape recorder may require that the tape guide members be positioned rearwardly of the associated tape drawing members with respect to the tape drawing direction in which that portion of the video tape is drawn out from the mouth of the tape cassette. FIG. 1 of the accompanying drawing illustrates, in perspective, a tape loading apparatus contemplated for use in the above discussed type of video tape recorder.

In FIG. 1, the tape cassette 1 having a length of magnetic video tape 4 is partially shown. As is well known, the tape cassette 1 is rectangular and has one of a pair of opposite sides formed as a "mouth" of the tape cassette 1, the mouth being selectively closed and opened by an elongated, hingedly supported flap 3. At the mouth of the tape cassette, the tape cassette 1 has a pair of spaced recesses 2a and 2b for accommodating the tape drawing means 6 and 12 entering therein from below when the tape cassette 1 inserted into the cassette holder (not shown), and is held at the set position. The flap 3 normally closing the mouth of the tape cassette 1 opens automatically, as the latter approaches the set position as is well known to those skilled in the art, to permit that portion of the video tape 4 confronting the mouth of the tape cassette to be exposed to the outside of the tape cassette 1. As is shown so far, the tape cassette 1 is of a design conforming to the well-known VHS (Video Home System) standards.

The tape guide cylinder, generally identified by 5, is mounted on the chassis with its longitudinal axis inclined at a relatively small angle to the chassis. The tape guide cylinder 5 comprises a rotary drum 5a carrying a plurality of, for example, four, video recording and/or reproducing heads 5c, and a stationary drum 5b having its outer peripheral surface formed with a tape guide groove which extends generally helically about the tape guide cylinder as a whole. Although not shown because they are well known expedients, a rotary transformer and a drive motor for driving the rotary drum 5a in one direction also comprises the rotary drum 5.

The tape drawing means 6 includes the tape drawing member 8 and the tape guide member 9 both mounted on a movable base 7 adapted to slide between an unloaded position, as shown, and a loaded position, defined by a stopper 10, along a grooved guide member 11 while guided by the guide groove in the grooved guide member 11. The grooved guide member 11 is slanted upwardly from the unloaded position, and hence, the tape drawing means 6 as a whole, moves upwardly when moved towards the loaded position so that, when the trailing and leading tape drawing means 6 and 12 have arrived at the unloaded position, the tape drawing means 6 is at a relatively higher position than is the tape drawing means 12, above the chassis. In this tape drawing means 6, the tape guide member 9 is positioned rearwardly of the tape drawing member 8 with respect to the tape drawing direction, i.e., the direction in which that portion of the video tape 4 is drawn out from the tape cassette 1 when held at the set position. And moreover, in view of the shape and size of the recess 2a in the tape cassette 1, the tape guide member 9 mounted on the movable base 7 is inclined towards a free end of the adjacent tape drawing member 8.

The tape drawing means generally identified by 12 is similar in construction to the tape drawing means 6 and includes the tape drawing member 13 and the tape guide member 14 both mounted on a moveable base (not shown) adapted to be moved between an unloading position, as shown, and a loading position, defined by a stopper 15, along a grooved guide member 16 while guided by the guide groove in the grooved guide member 16. This tape drawing means, when at the loading position, is held at a relative elevation equal to or substantially equal to that occupied by the same when held at the unloading position, but is held at a relatively lower position than the position occupied by the tape drawing means 6 when the latter is at the loading position. Accordingly, although the tape guide member 14 is positioned rearwardly of the tape drawing member 13 with respect to the tape drawing direction, it is not inclined as is the tape guide member 9, but is mounted on the movable base so as to extend parallel to the adjacent tape drawing member 13.

It is to be noted that, since the recess 2b in the tape cassette 1 conforming to the VHS standards has a depth greater than the recess 2a in the same tape cassette 1, the tape guide member 14 may have a diameter greater than that of the tape guide member and may be juxtaposed rearwardly and in the vicinity of the adjacent tape drawing member 13.

In the contemplated tape loading apparatus shown in and described with reference to FIG. 1, however, it has been found that, when the tape cassette 1 is brought to the set position by being lowered from above in a direction shown by the arrow A to reach the set position, that portion of the video tape 4 exposed through the mouth of the tape cassette 1 may often be trapped between the tape drawing member and the tape guide member of one or both of the tape drawing means 6 and 12, particularly between those of the tape drawing means 6 as shown by the phantom line in FIG. 1. Once this happens, and when the video tape recorder is subsequently set in operation with both of the tape drawing means 6 and 12 driven towards the respective loading positions, that portion of the video tape 4, and, hence, the length of video tape 4 as a whole, will be detrimentally impaired to such an extent that video and audio information contained in that portion of the video tape 4 will no longer be reproduced, or to such an extent that the operator or user of the video tape recorder who wishes to make a recording of, for example, televised video and audio information will have to discard the cassette tape because of the presence of that detrimentally impaired portion of the video tape 4.

The above described problem appears to result from the fact that, as the tape cassette 1 inserted into the cassette holder (not shown) is shifted in the direction of arrow A, air present beneath the tape cassette 1 is compressed to produce air pressure acting in a direction, shown by the arrow B, forcing a portion of the video tape 4 confronting the recess 2a in the tape cassette 1 to be bent in a direction inwardly of the recess 2a. This is, however, not the only cause of the problem, and it appears that a similar phenomenon may occur as a result of the particular arrangement and coordination of the component parts including a cabinet, and/or when the cassette holder is manually quickly pressed down to move the tape cassette 1 in the direction of arrow A. A still further cause of the problem includes the loosening of the length of video tape within the tape cassette 1.

With respect to the leading tape drawing means 12, the above discussed problem may occur less likely therewith because the recess 2b in the tape cassette 1, which is operatively associated with the leading tape drawing means 12, has a relatively great depth, as compared with that of the recess 2a, i.e. one that is sufficient to allow the tape drawing and guide members 13 and 14 to be positioned set-back from the tape drawing means 6 in a direction away from the tape guide cylinder 5.

SUMMARY OF THE INVENTION

The present invention has been developed to substantially eliminate the above discussed problem inherent in the contemplated tape loading apparatus and has for its essential object to avoid any possible entry of a portion of the video tape in between the tape drawing and guide members of at least one of the pairs of tape drawing means during the lowering of the tape cassette towards the set position even though that portion of the video tape may bend inwardly of the associated recess in the tape cassette under the influence of air pressure.

In order to accomplish the above described object, the present invention provides at least one of the paired tape drawing means with a tape protective member mounted on top of one of the tape drawing and guide members thereof for avoiding any possible entry of that portion of the video tape in between the tape drawing and guide members.

By the provision of the tape protective member, that portion of the video tape can be positively guided so as to come to one side of the tape drawing member opposite to the tape guide member without the possibility of entering in between these tape drawing and guide members. Therefore, the length of video tape as a whole can advantageously be prevented from being detrimentally impaired.

The above and other objects and features of the invention will appear in the following description and appended claims, reference being made to the accompanying drawings forming a part of this specification wherein like reference characters designate corresponding parts in the several views.

DETAILED DESCRIPTION OF THE EMBODIMENT

Figure 1:
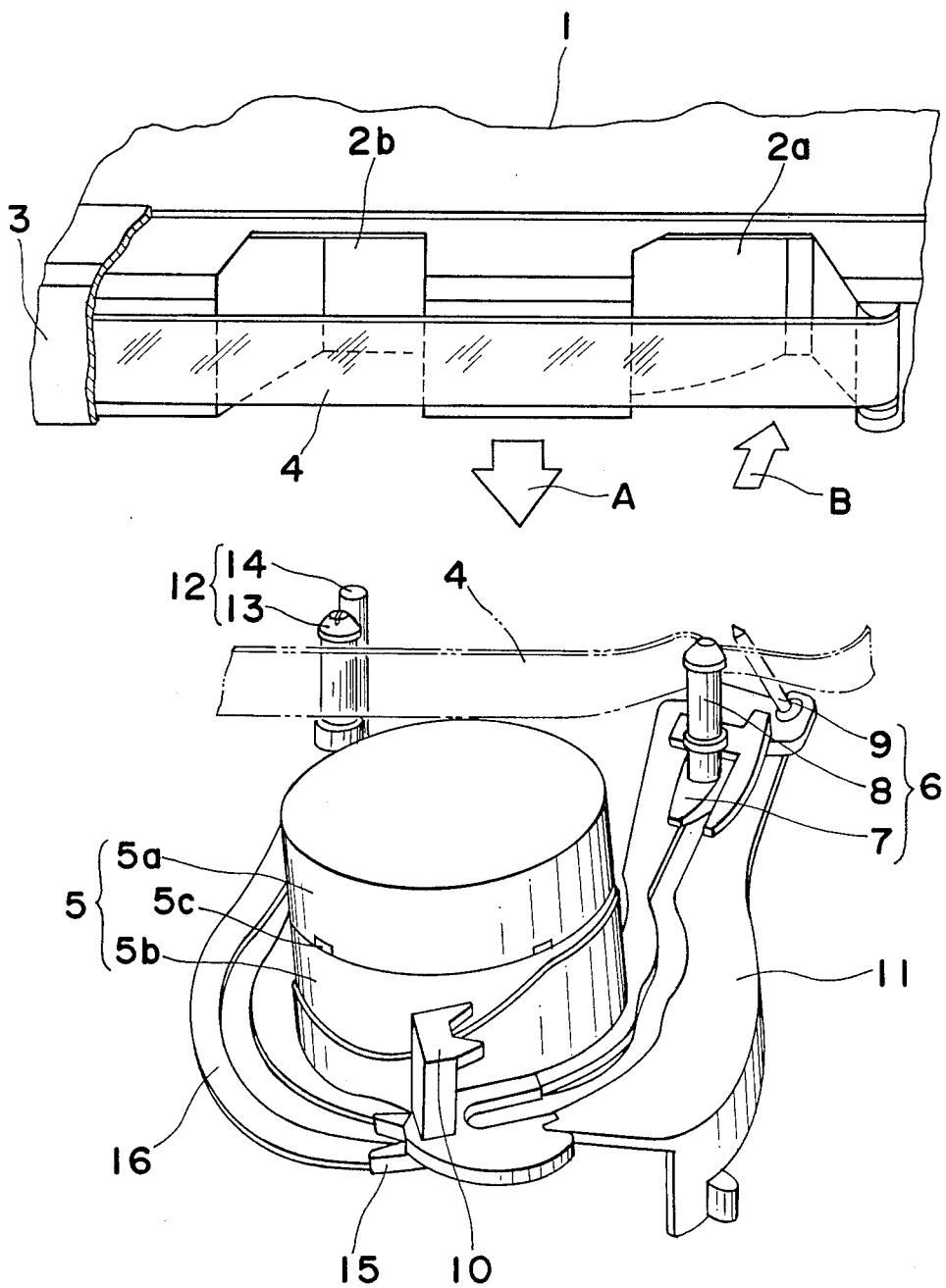
FIG. 1 is a perspective view of the prior art apparatus for loading a magnetic tape from a tape cassette, which apparatus is shown in relation to the tape cassette partially shown therein.
Figure 2:
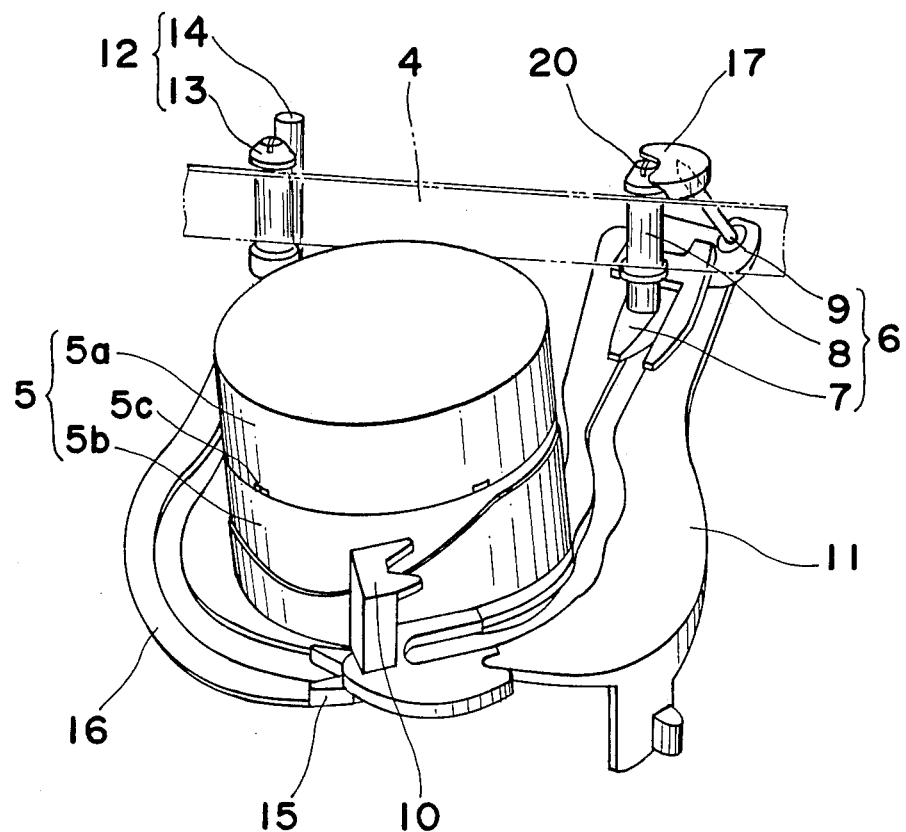
FIG. 2 is a perspective view of a tape loading apparatus embodying the present invention.
Figure 3:
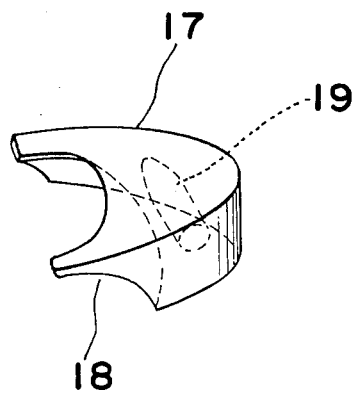
FIG. 3 is a perspective view, in an enlarged scale, of a tape protective member used in the apparatus.

Referring to the accompanying drawings, and as best shown in FIG. 2, a tape protective member 17 is mounted on a top end of the tape guide member 9, forming a part of the tape drawing means 6, for avoiding any possible entry of that portion of the video tape 4, confronting the recess 2a in the tape cassette 1, in between the tape drawing members 8 and tape guide member 9 during the lowering of the tape cassette 1 towards the set position in the direction shown by the arrow A in FIG. 1. Only the use of the tape protective member 17 differentiates the loading apparatus according to the present invention from that of the prior art shown in FIG. 1. As best shown in FIG. 3, the tape protective member 17 has a blind hole 19 defined therein for tightly receiving a top end of the tape guide member 9 and, also, an inwardly recessed, generally hemispherical face 18 defined therein and shaped to overhang the top end of the tape drawing member 8. This tape protective member 17 is preferably made of synthetic resin, for example, DURACON resin and is so positioned on the tape guide member 9 that it will not provide an obstruction to that portion of the video tape being drawn out from the mouth of the tape cassette 1.

Specifically, in view of the fact that the tape drawing member 8 is mounted on the movable base 7 for axial adjustment between lifted and lowered positions by means of a height adjustment screw 20, the inwardly recessed, generally hemispherical face 18 is shaped and sized so as to permit a portion of a head of the height adjustment screw 20 to be exposed and to be accessible to a screw driver even when the tape protective member 17 has been mounted on the tape guide member 9 so as to partially overhang the free end of the tape drawing member 8.

From the foregoing description, it is clear that the tape protective member employed according to the present invention constitutes the means for avoiding any possible entry of that portion of the video tape in between the tape drawing and guide members of the trailing tape drawing means during the lowering of the tape cassette towards the set position. Therefore, any possible impairment of the cassette tape as well as any possible obstruction to the tape drawing operation can advantageously be minimized, permitting a favorable recording or reproduction of video and audio information.

It is further understood by those skilled in the art that the forgoing description is made as to a preferred embodiment of the disclosed invention and that various changes and modifications may be made according to the invention without departing from the spirit and scope thereof. For example, if desired, the tape protective member may be in the form of a generally conical member having both of the hemispherical face and the blind hole, in which case a conical face can provide a guide slope for guiding that portion of the video tape towards one side of the tape drawing member opposite to the tape guide member during the lowering of the tape cassette.

Moreover, for the purpose of minimizing the number of component parts to be assembled together, the tape protective member may be integrally formed with the tape guide member.

Furthermore, a tape protective member similar to the illustrated tape protective member may also be mounted on the tape guide member forming a part of the tape guide means 12.

Accordingly, such changes and modifications are to be understood as included within the scope of the present invention as defined by the appended claims.

What is claimed is:

1. A tape loading apparatus for drawing magnetic tape in a tape drawing direction out of a tape cassette which is inserted and lowered to a set position therein and for urging a portion of the tape around a tape guide cylinder, said apparatus comprising:
   first and second tape drawing means movable in said tape drawing direction between a first unloading position adjacent the magnetic tape when the cassette is at said set position and a second loading position at which the portion of the magnetic tape is drawn out from the cassette and urged around the tape guide cylinder,
   said first and said second tape drawing means each including a tape drawing member and a tape guide member which are mounted on a movable base and extend therefrom to respective top ends thereof, said movable base slidable between said unloading position and said loading position, and at least said tape drawing member of said first tape drawing means having a height adjusting means for adjusting the height thereof relative to the tape guide member of the first tape drawing means and to the movable base from which it extends; and
   a tape protective member mounted on the top end of the tape guide member of said first tape drawing means and extending over only a portion of the top end of the tape drawing member of said first tape drawing means for preventing the magnetic tape from being inserted between the tape guide member and the tape drawing member of said first tape drawing means when the tape cassette is lowered to the set position and for allowing said height adjusting means to be accessed and adjusted.

2. A tape loading apparatus as claimed in claim 1, wherein said tape protective member is comprised of a synthetic resin and has a mounting hole extending therethrough in which the top end of said tape guide member of the first tape drawing means extends and is tightly fitted to the tape protective member therein.

3. A tape loading apparatus as claimed in claim 2, wherein said tape protective member further has a hemispherical face extending from an edge of a recess defined therein for accommodating said top end of the tape drawing member of the first tape drawing means.

4. A tape loading apparatus as claimed in claim 1, wherein said first tape drawing means provided with said tape protective member is disposed rearward of the magnetic tape with respect to the tape drawing direction when moving between said first unloading position and said second loading position.

5. A tape loading apparatus as claimed in claim 1, and further comprising means for positioning said first tape drawing means provided with said tape protective member at a position that is relatively higher than a position of said second tape drawing means when both said first and said second tape drawing means are at said second loading position.

6. A tape loading apparatus as claimed in claim 1, wherein said first and said second tape drawing means urge the magnetic tape around the tape guide cylinder through a radial distance of 270° when at said second loading position.

7. A tape loading apparatus as claimed in claim 1, wherein said height adjusting means is disposed on the top end of said tape drawing member of said first tape drawing means.

8. A tape loading apparatus for drawing magnetic tape in a tape drawing direction out of a tape cassette which is inserted and lowered to a set position therein and for urging a portion of the tape around a tape guide cylinder, said apparatus comprising:
   first and second tape drawing means movable in said tape drawing direction between a first unloading position that is rearward of the magnetic tape with respect to the tape drawing direction when the cassette is at said set position and a second loading position at which the portion of the magnetic tape is drawn out from the cassette and urged around the tape guide cylinder, said first and said second tape drawing means each including a tape drawing member and a tape guide member spaced therefrom which are mounted on a movable base and extend therefrom to respective top ends thereof, said movable base slidable between said unloading position and said loading position, and said tape drawing member of said first tape drawing means being positioned ahead of said tape guide member of said first tape drawing means with respect to said tape drawing direction, said tape drawing member of said first tape drawing means initially contacting the portion of the magnetic tape when the cassette is in said set position and said first tape drawing means is moved from said first unloading position toward said second loading position; and a tape protective member mounted on the top end of the tape guide member of said first tape drawing means and extending over only a portion of the top end of the tape drawing member of said first tape drawing means leaving a forwardmost portion of the top end thereof exposed with respect to said tape drawing direction for preventing the magnetic tape from being inserted between the tape guide member and the tape drawing member of said first tape drawing means when the tape cassette is lowered to the set position while allowing the portion of the magnetic tape to be positioned immediately ahead of the forward most part of the top end of the tape drawing member of said first tape drawing means when the first tape drawing means is in said first unloading position and the cassette is lowered to said set position.

* * * * *